United States Patent
Morita et al.

(10) Patent No.: US 12,530,091 B2
(45) Date of Patent: Jan. 20, 2026

(54) INPUT DEVICE WITH A MOVEABLE STRAP

(71) Applicant: Sony Interactive Entertainment Inc., Tokyo (JP)

(72) Inventors: Masaho Morita, Tokyo (JP); Isao Okuyama, Tokyo (JP); Katsuhisa Tadano, Kanagawa (JP); Takeshi Igarashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/691,062

(22) PCT Filed: Sep. 21, 2021

(86) PCT No.: PCT/JP2021/034653
§ 371 (c)(1),
(2) Date: Mar. 12, 2024

(87) PCT Pub. No.: WO2023/047473
PCT Pub. Date: Mar. 30, 2023

(65) Prior Publication Data
US 2024/0377898 A1    Nov. 14, 2024

(51) Int. Cl.
*G06F 3/03* (2006.01)
*A63F 13/24* (2014.01)
*G06F 3/0346* (2013.01)

(52) U.S. Cl.
CPC ............ *G06F 3/0346* (2013.01); *A63F 13/24* (2014.09)

(58) Field of Classification Search
CPC . G06F 3/0346; G06F 3/03–0395; A63F 13/24
See application file for complete search history.

(56) References Cited

U.S. PATENT DOCUMENTS

| | | | |
|---|---|---|---|
| 6,394,906 B1 | 5/2002 | Ogata | |
| 2013/0207890 A1* | 8/2013 | Young | G06F 3/014 |
| | | | 345/156 |
| 2021/0069583 A1 | 3/2021 | Kawaguchi et al. | |
| 2022/0118368 A1* | 4/2022 | Chi | A63F 13/98 |
| 2024/0382839 A1 | 11/2024 | Tadano et al. | |

FOREIGN PATENT DOCUMENTS

| | | |
|---|---|---|
| CN | 101663074 B | 3/2012 |
| EP | 3425487 A1 | 1/2019 |
| JP | 2003-199974 A | 7/2003 |

(Continued)

OTHER PUBLICATIONS

International Search Report and Written Opinion mailed on Oct. 19, 2021, received for PCT Application PCT/JP2021/034653, filed on Sep. 21, 2021, 09 pages including English Translation.

*Primary Examiner* — Roy P Rabindranath
(74) *Attorney, Agent, or Firm* — Fish & Richardson P.C.

(57) ABSTRACT

Provided is an input device in which a hand of a user can be fixed to a grip at a position suitable for a length of a finger or a size of the hand and the position of the finger can be adapted to a position of an operation button. In the input device, in a state in which the grip is viewed in side elevation, the position of a base to which a strap is attached can be moved in an upward and downward direction and a forward and rearward direction, and the base is rotatable.

9 Claims, 12 Drawing Sheets

(56) References Cited

FOREIGN PATENT DOCUMENTS

| JP | 3132531 U | 6/2007 |
| JP | 2011-164932 A | 8/2011 |
| JP | 2012-055340 A | 3/2012 |
| JP | 2017-000757 A | 1/2017 |
| JP | 2019-032850 A | 2/2019 |
| JP | 2021-505997 A | 2/2021 |
| WO | WO 2017221432 A1 | 12/2017 |
| WO | WO 2019113245 A1 | 6/2019 |

* cited by examiner

INPUT DEVICE WITH A MOVEABLE STRAP

CROSS-REFERENCE TO RELATED APPLICATION

The present application is based on International Patent Application No. PCT/JP2021/034653, filed Sep. 21, 2021, the content of which is hereby incorporated by reference.

TECHNICAL FIELD

The present disclosure relates to an input device that is operated by a user while being grasped by the user.

BACKGROUND ART

An input device of a bar-like shape having a grip that is grasped by a user's hand and a button arranged at an upper portion of the grip is used, for example, for operation of a game machine (for example, refer to PTL 1 given below). The user operates the button with the thumb or forefinger of the hand grasping the grip.

CITATION LIST

Patent Literature

[PTL 1]
Japanese Patent Laid-open No. 2011-164932

SUMMARY

Technical Problem

In order to improve the mounting stability between the grip and the hand of the user, it is considered to fix the hand of the user to the grip with a strap attached to the grip. If the hand of the user can be fixed to the grip, it becomes possible to control a game on the basis of, for example, such a movement that the hand with which the input device is grasped is opened. For example, it becomes possible to implement such an action as to throw an object (for example, a ball) in a virtual reality (VR) space provided to the user through a head-mounted display. However, if the hand of the user is not fixed at a position suitable for the length of the finger or the size of the hand, the position of the operation button and the position of the finger are not adapted to each other, resulting in the possibility that the operability of the input device may be impaired.

Solution to Problem

An example of the input device proposed in the present disclosure includes an operation unit having disposed thereon an operation member that is operated by a user with his/her finger, a grip located below the operation unit and extending in an upward and downward direction, and a strap located leftward or rightward with respect to the grip. When the grip is viewed in a leftward and rightward direction, a position of the strap is movable in at least either the upward and downward direction or a forward and rearward direction, and the strap is rotatable.

With this input device, the hand of the user can be fixed at a position suitable for the length of the finger and the size of the hand, and the position of the finger can be adapted to the position of the operation button.

It is to be noted that, in the input device, the strap may be movable in only one direction (for example, in the upward and downward direction, the forward and rearward direction, or a direction inclined with respect to both the upward and downward direction and the forward and rearward direction) or may be movable in two directions (for example, in the upward and downward direction and the forward and rearward direction).

DESCRIPTION OF EMBODIMENTS

In the following, the input device proposed in the present disclosure is described. In the present specification, as an example of the input device proposed in the present disclosure, an input device 100 that is used for operation of a game machine is described. It is to be noted that the input device proposed in the present disclosure may otherwise be an input device used for operation of an information processing apparatus different from a game machine (for example, an input device used for operation of a simulation apparatus, an input device used for operation of a vehicle, a ship, or an aircraft, or the like).

Figure 1:
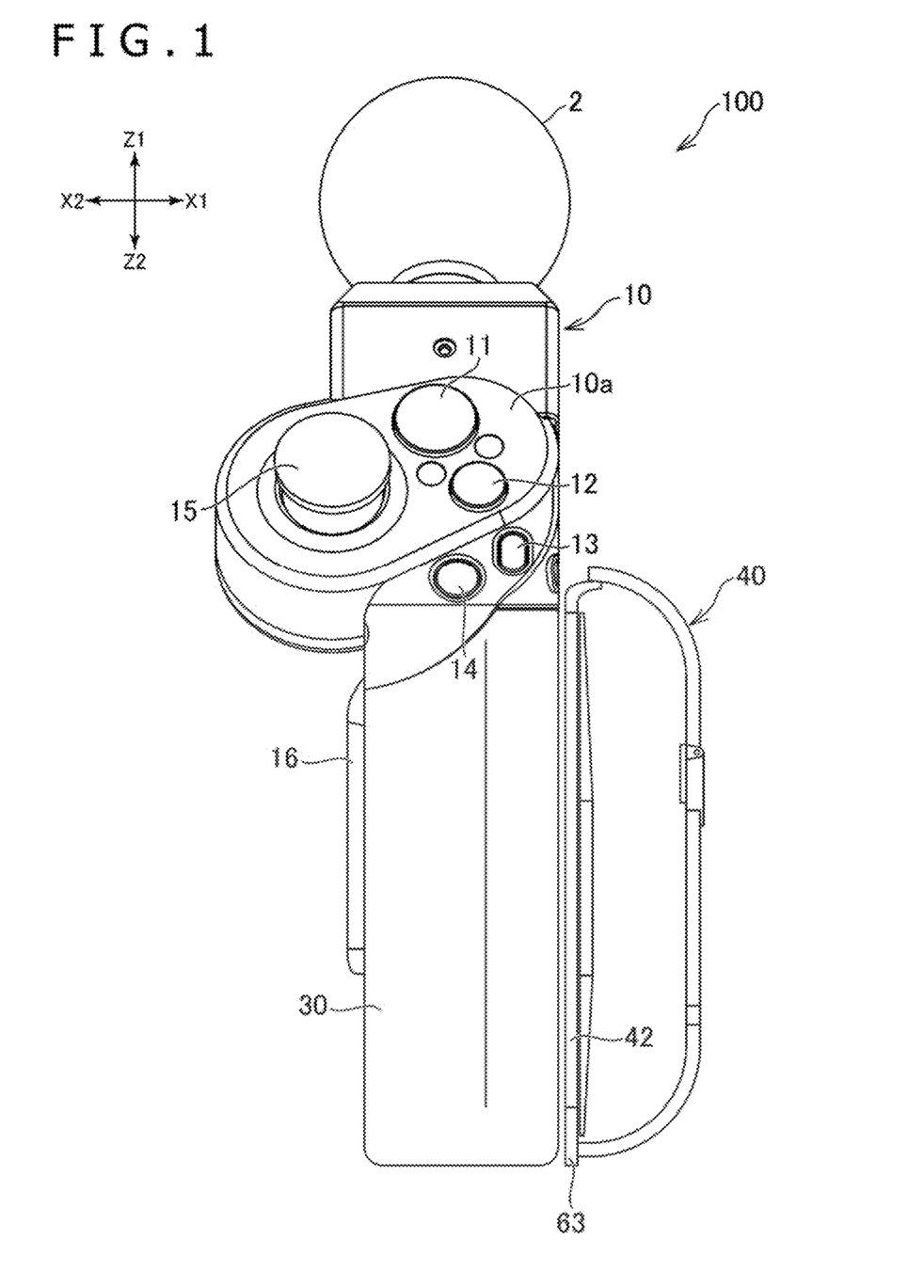
FIG. 1 is a front elevational view depicting an example of an input device proposed in the present disclosure.
Figure 2:
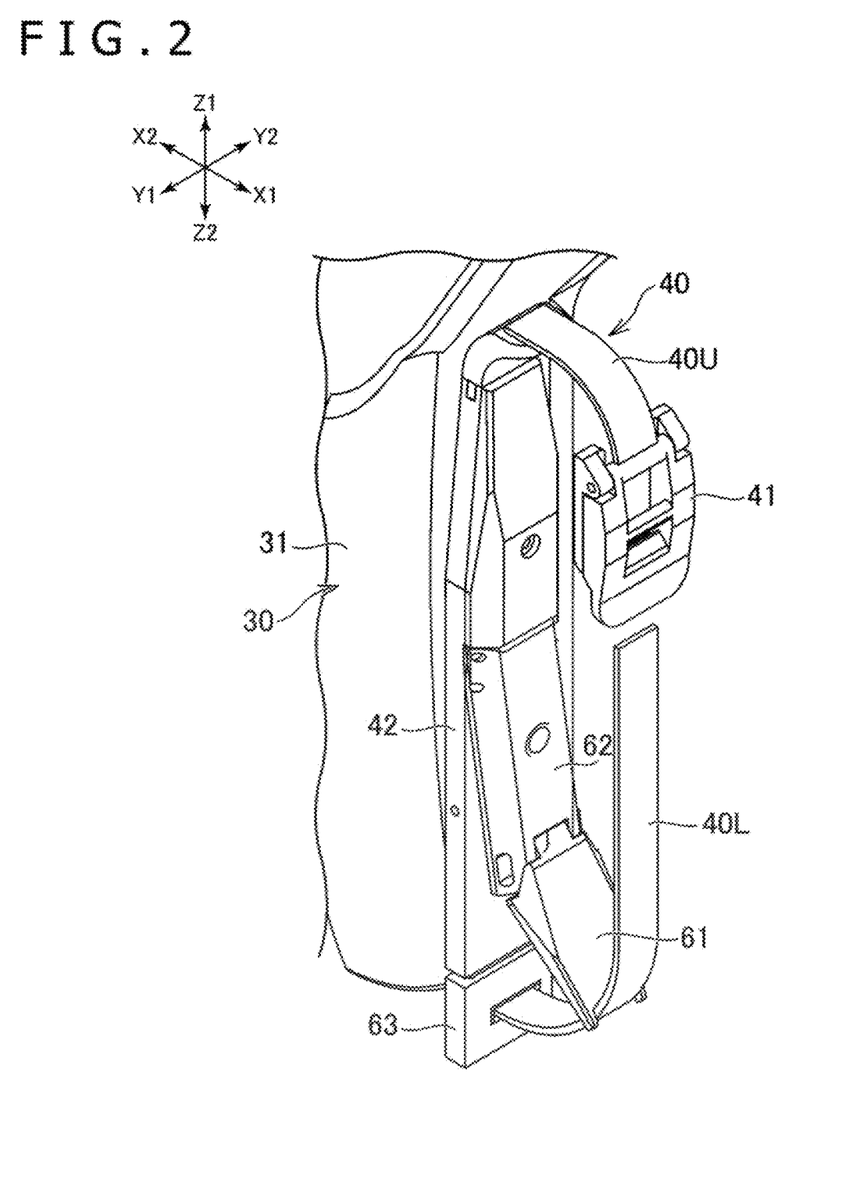
FIG. 2 is a perspective view depicting a main part of the input device.

In the present specification, directions indicated by Z1 and Z2 in FIG. 1 are referred to as upward and downward, respectively, and the upward and downward direction is an extension direction of a grip 30. Further, directions indicated by X1 and X2 in FIG. 1 are referred to as rightward and leftward, respectively, and directions indicated by Y1 and Y2 in FIG. 2 are referred to as forward and rearward, respectively. These directions are used for explanation of relative positional relations of elements (parts, members, and portions) of the input device 100 and do not specify a posture of the input device 100 when it is used.

General Configuration

As depicted in FIG. 1, the input device 100 has an operation unit 10 at an upper portion thereof. A plurality of operation members for being operated by a user's finger are arranged on the operation unit 10. In particular, push buttons 11, 12, 13, and 14 and an operation stick 15 are arranged as the plurality of operation members on the operation unit 10. (In the following description, where the operation buttons 11 to 14 and the operation stick 15 are not to be distinguished from one another, they are referred to as operation members 11 to 15.) The operation members 11 to 15 are provided on a front face 10a of the operation unit 10. The input device 100 transmits a signal according to an operation performed on any of the operation members 11 to 15 to a game apparatus in a wireless or wired manner. The type and the number of operation members are not limited to those in the example described here. For example, the input device 100 may have a cross key in place of the operation stick 15 or together with the operation stick 15. In another example, the number of operation members the input device 100 has may be only one.

As depicted in FIG. 1, the input device 100 may have a light emitting unit 2. The light emitting unit 2 has, for example, a shape of a ball and is arranged at an uppermost portion of the input device 100. The game machine tracks the position and size of the light emitting unit 2 through a camera connected to the game machine and executes information processing relating to a game on the basis of information acquired by the tracking. For example, one or a plurality of light emitting units may be arranged in a state in which they are embedded inside a housing of the input device. Further, the input device 100 may not have the light emitting unit 2.

Grip and Strap

As depicted in FIG. 1, the input device 100 has the grip 30 that is located below the operation unit 10 and extends in the upward and downward direction. The user operates the operation members 11 to 15 with a finger (particularly, with the thumb) while grasping the grip 30. Also, the grip 30 may have a button 16 provided thereon. The button 16 can be operated, for example, with the middle finger or the ring finger. Although the grip 30 has a shape of, for example, a bar, it may have any other shape as long as it is shaped such that it can be grasped by a hand.

As depicted in FIG. 1, a strap 40 is arranged rightward of the grip 30. The user puts the right hand between the strap 40 and the grip 30 to grasp the grip 30. The grip 30 is fixed to the hand of the user by the strap 40. As a result, the user can open the hand with which the grip 30 is grasped, while the input device 100 is used. By this movement of the hand, for example, an action of the user throwing an object (for example, a ball) can be implemented in a VR space provided by the game apparatus.

As depicted in FIG. 2, the strap 40 has an upper strap 40U and a lower strap 40L. A fastening part 41 is attached to an end portion of the upper strap 40U such that the upper strap 40U and the lower strap 40L can be connected to or disconnected from each other by the fastening part 41. The fastening part 41 may be configured such that the length of the strap 40 can be adjusted.

As depicted in FIG. 2, the input device 100 has a base 42 arranged along the grip 30. An upper end and a lower end of the strap 40 are attached to the base 42. The strap 40 and the base 42 generally configure a ring in which the hand is to be put.

The structure of the strap 40 is not restricted to the example depicted in FIG. 2. For example, the strap 40 may not include the upper strap 40U and the lower strap 40L separate from each other. In this case, the lower end or the upper end of the strap 40 may be detachably attached to the base 42. Further, the input device 100 may be configured for the left hand. In other words, the strap 40 and the base 42 may be located leftward of the grip 30. Also, the thickness of the strap 40 is not restricted to any specific value.

Movement of Strap

In the input device 100, the relative positions of the base 42 and the grip 30 can be changed. Since both the upper end and the lower end of the strap 40 are attached to the base 42, the position of the entire strap 40 can be adjusted by moving the position of the base 42.

Figure 5:
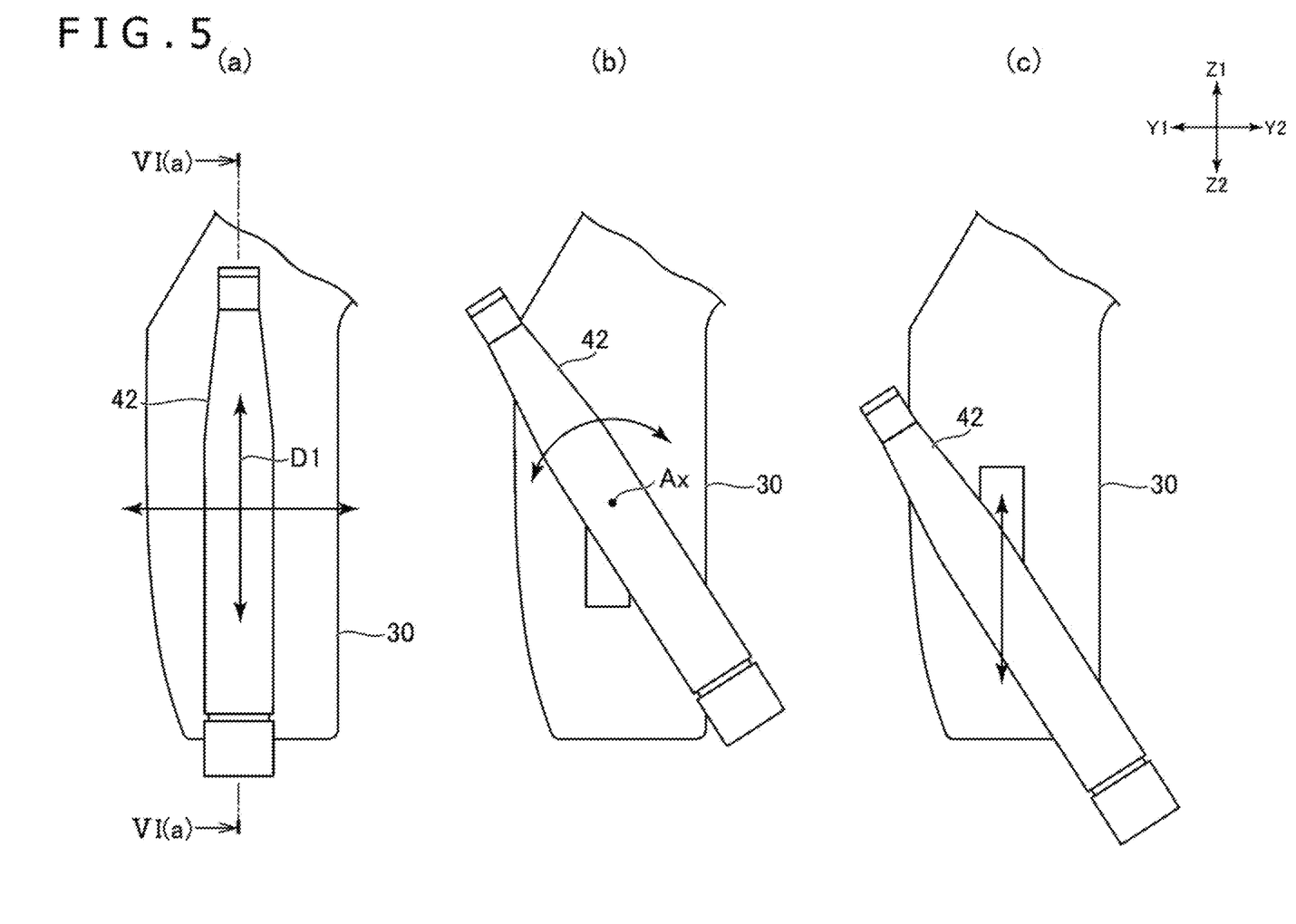
FIG. 5 illustrates side elevational views depicting movements of a base.

As depicted in (a) of FIG. 5, the position of the base 42 can be moved in the upward and downward direction (direction of an arrow mark D1) and the forward and rearward direction (direction of an arrow mark D2) as viewed in side elevation of the grip 30. That is, the base 42 can parallelly move in the upward and downward direction and the forward and rearward direction. Further, as depicted in (b) of FIG. 5, the base 42 can be rotated around a center line Ax extending along the leftward and rightward direction. At this time, the upper end of the strap 40 moves forward (or rearward) with respect to the grip 30, and conversely, the lower end of the strap 40 moves rearward (or forward) with respect to the grip 30. By this structure, the hand of the user can be fixed at a position suitable for the length of the finger and the size of the hand, and therefore, the position of the finger can be optimized with respect to the position of the operation members 11 to 15. It is to be noted that, in the input device 100, it is also possible to adjust the position of the base 42 in the upward and downward direction in a state in which the base 42 is tilted in the forward and rearward direction as depicted in (c) of FIG. 5.

The movement of the base 42 is not limited to the examples depicted in FIG. 5, and, for example, the parallel movement of the base 42 may be permitted only in either the forward and rearward direction or the upward and downward direction or may be permitted only in one direction inclined with respect to the upward and downward direction and the forward and rearward direction. Further, in (b) of FIG. 5, the center line Ax is positioned between the upper end and the lower end of the base 42, and the upper end and the lower end of the base 42 individually move relative to the grip 30 by the rotation of the base 42. However, alternatively, the base 42 may rotate in a state in which the position of the upper end thereof is fixed, with the position of the lower end thereof moving in the forward and rearward direction, or may rotate in a state in which the position of the lower end thereof is fixed, with the position of the upper end thereof moving in the forward and rearward direction.

Position Adjustment Mechanism

Figure 3:
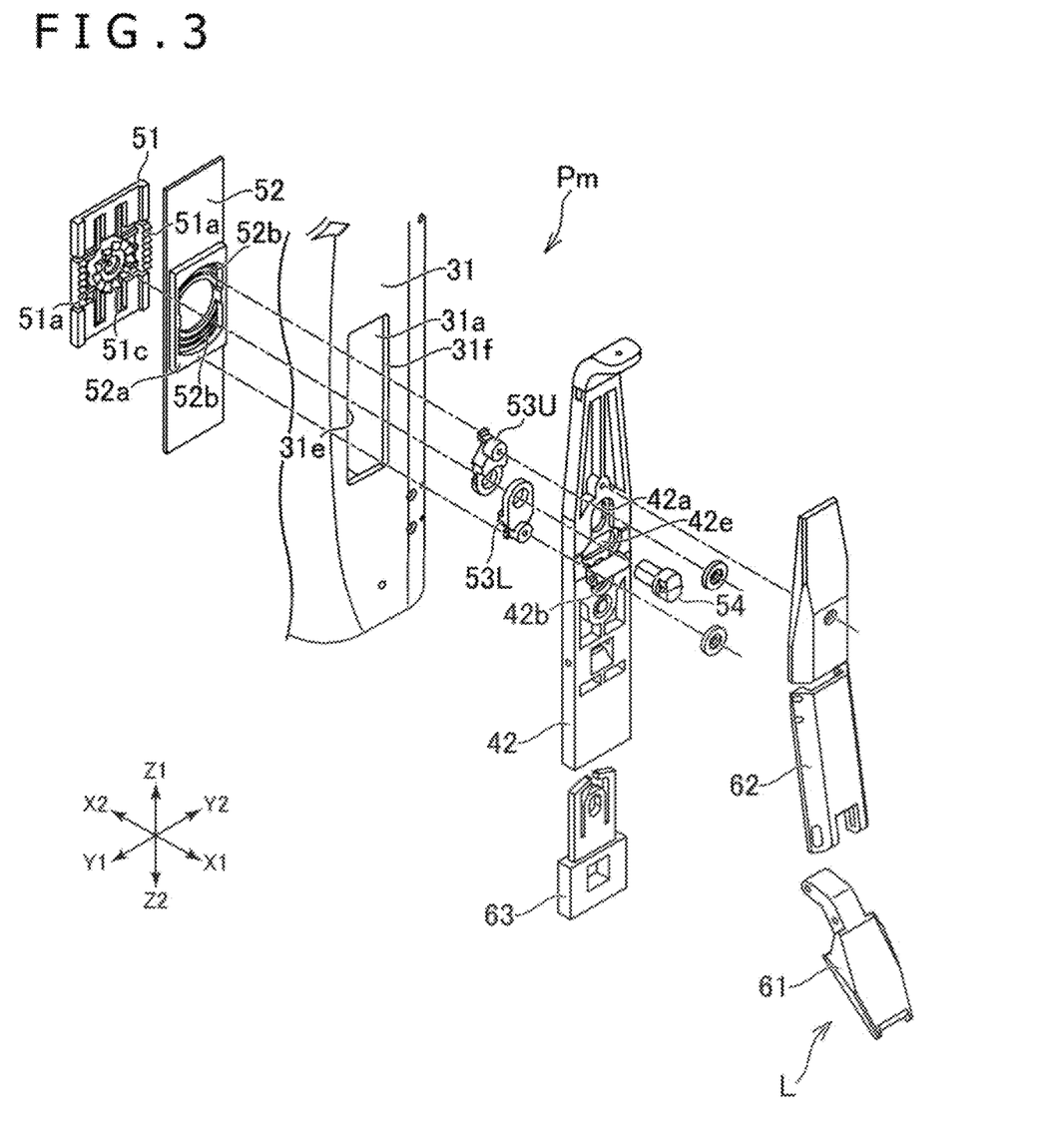
FIG. 3 is an exploded perspective view of a position adjustment mechanism.
Figure 6A:
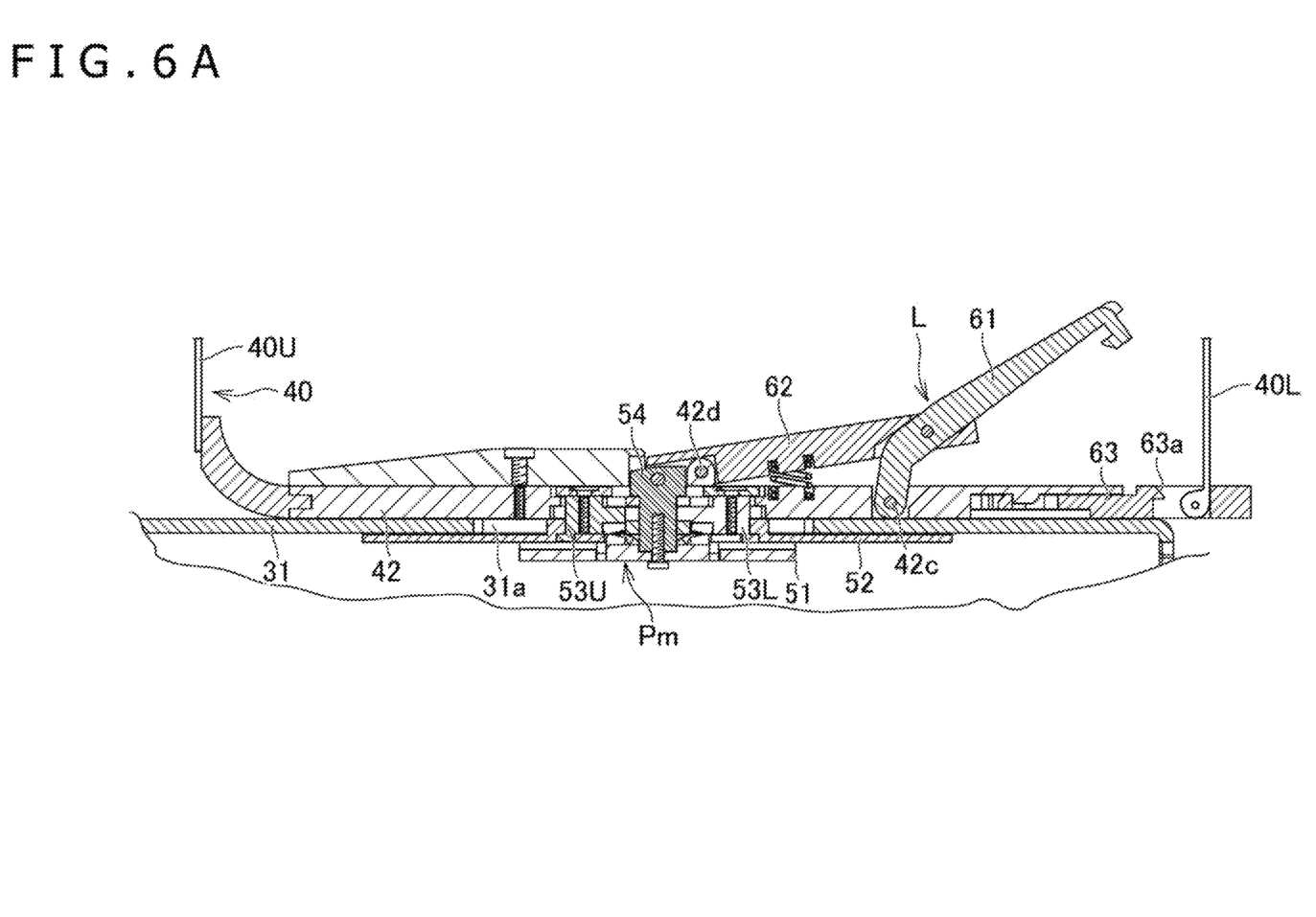
FIG. 6A is a cross sectional view of the position adjustment mechanism. The sectional plane of the cross sectional view is a plane denoted by line VI-VI in (a) of FIG. 5. In this figure, a lock operation member is positioned in an unlock position.
Figure 6B:
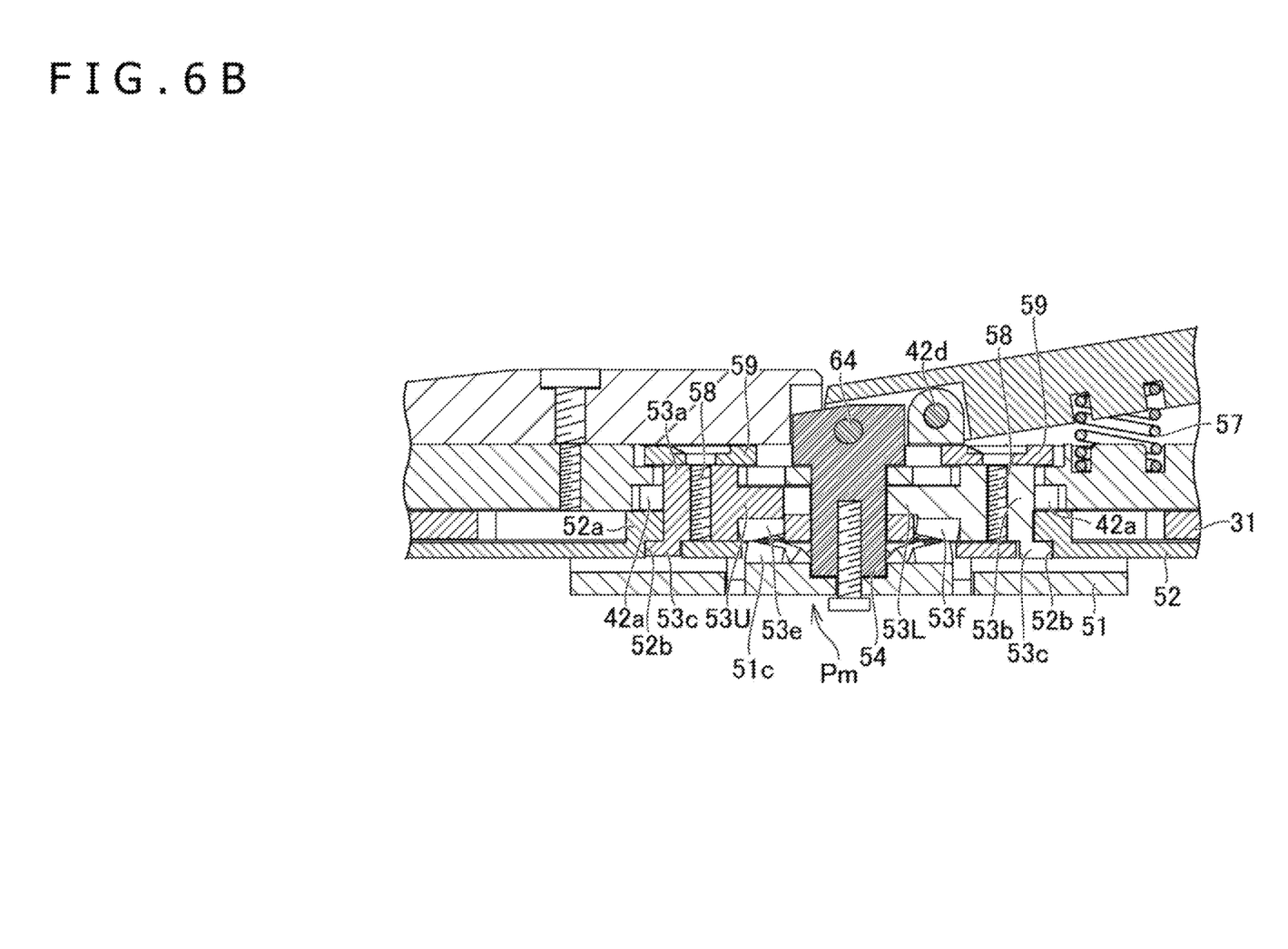
FIG. 6B is an enlarged view of the position adjustment mechanism depicted in FIG. 6A.

In the following, a mechanism that implements the movements of the base 42 depicted in FIG. 5 is described. As depicted in FIG. 3, the input device 100 has a position adjustment mechanism Pm for adjusting the position of the base 42. The position adjustment mechanism Pm has a movable plate 51, links 53U and 53L, a link guide 52, and a support shaft 54. Further, the position adjustment mechanism Pm has a lock mechanism L for fixing the position of the base 42. The lock mechanism L has a lock operation lever 61, an intermediate lever 62, and a lock slider 63. As depicted in FIGS. 6A and 6B, the movable plate 51 is arranged on an inner side of a grip wall 31 that configures the external form of the grip 30. The movable plate 51 is movable along the grip wall 31. In the example of the input device 100, the movable plate 51 is movable in the upward and downward direction (direction indicated by Z1-Z2 in FIG. 6A). The base 42 is connected to the movable plate 51. In particular, the base 42 is connected to the movable plate 51 through the support shaft 54. The base 42 moves in the upward and downward direction together with the movable plate 51.

As depicted in FIGS. 6A and 6B, the link guide 52 is arranged on the inner side of the grip wall 31 and is attached to the movable plate 51. The grip wall 31 has a guide opening 31a (refer to FIG. 3) defined therein. A guided portion 52a is formed on the link guide 52. The guided portion 52a is a protruding portion that is to fit in the guide opening 31a, and the movement of the movable plate 51 and the link guide 52 is guided in the upward and downward direction by edges of the guide opening 31a (a front edge 31e and a rear edge 31f, refer to FIG. 3). The width of the guide opening 31a in the forward and rearward direction corresponds to the width of the guided portion 52a in the forward and rearward direction, and the movement of the movable plate 51 and the link guide 52 is permitted only in the upward and downward direction and is restricted in the forward and rearward direction. The movable range of the movable plate 51 and the link guide 52 is defined by an upper edge and a lower edge of the guide opening 31a.

The structure for guiding the movable plate 51 and the link guide 52 is not limited to the example of the input device 100. For example, a recessed portion may be formed on the link guide 52, and the grip wall 31 may have, as a guide portion, a protruding portion that is to fit in the recessed portion. Alternatively, the movable plate 51 and the link guide 52 may be formed integrally. In a still further example, the direction in which the movable plate 51 is guided by the grip wall 31 is not restricted to the upward and downward direction. The movable plate 51 may be guided, for example, in a direction inclined with respect to the upward and downward direction and the forward and rearward direction.

Figure 7:
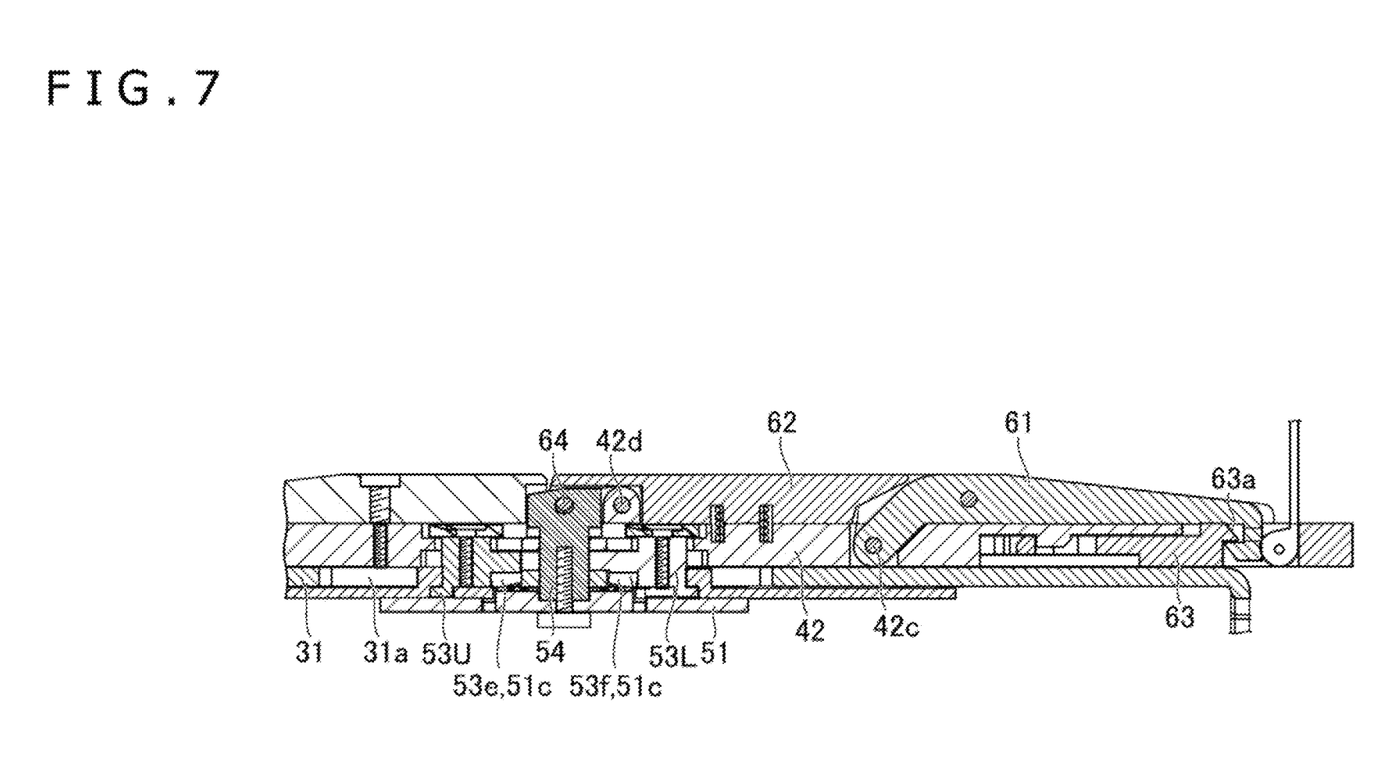
FIG. 7 is a cross sectional view of the position adjustment mechanism in a state in which the lock operation member is in a lock position.
Figure 8A:
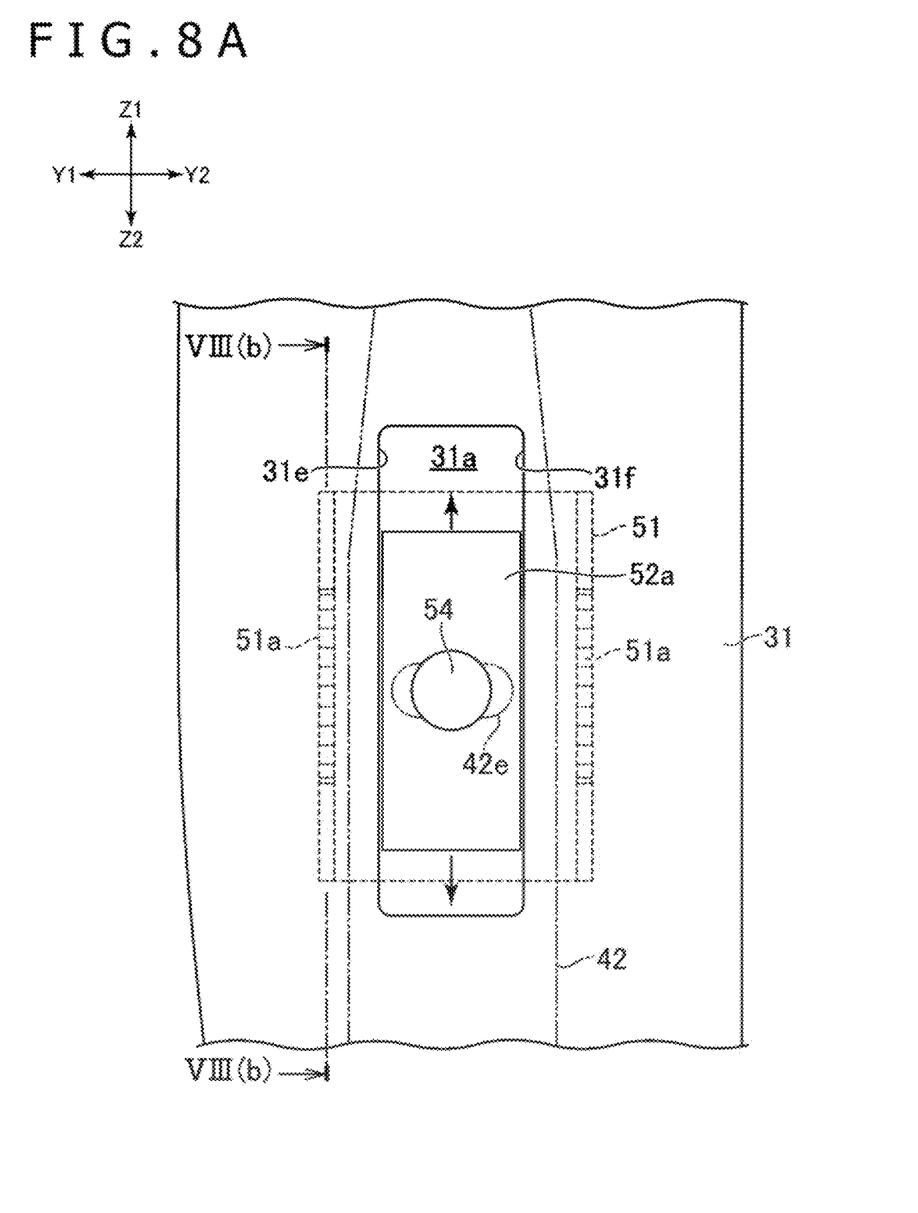
FIG. 8A is a side elevational view of a grip, in which the position adjustment mechanism is depicted. In this figure, the links configuring the position adjustment mechanism are omitted.
Figure 8B:
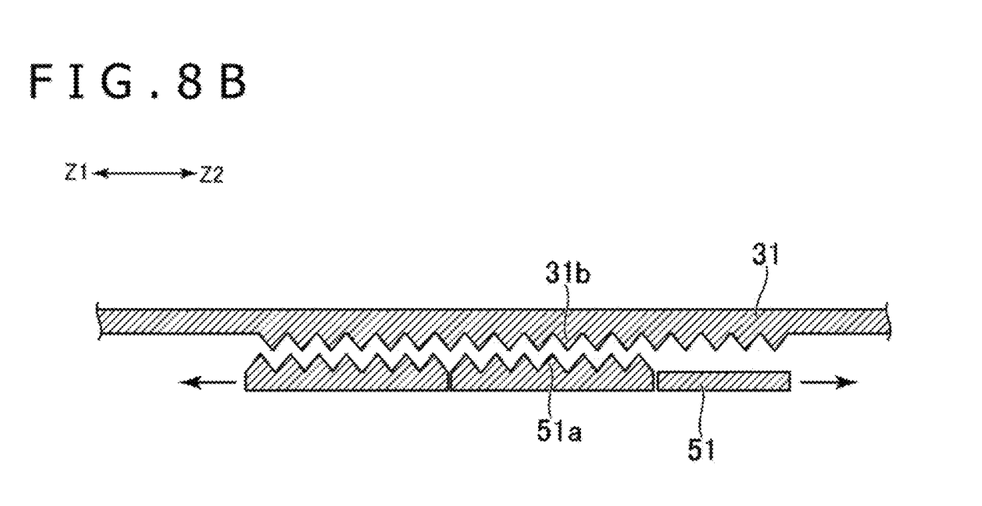
FIG. 8B is a cross sectional view taken along line VIII (b)-VIII (b) depicted in FIG. 8A.

As depicted in FIGS. 8A and 8B, a stopper counterpart 51a in the form of gear teeth is formed on a front edge and a rear edge of the movable plate 51. Meanwhile, a stopper 31b in the form of gear teeth extending in the upward and downward direction is formed on an inner face of the grip wall 31. The movable plate 51 is movable between a non-engaging position (refer to FIG. 6B) in which it is spaced from the inner face of the grip wall 31 and an engaging position (refer to FIG. 7) in which it is pressed against the inner face of the grip wall 31. When the movable plate 51 is in the non-engaging position, the stopper counterpart 51a is spaced from the stopper 31b, and therefore, the movement of the movable plate 51, the link guide 52, and the base 42 is permitted. On the other hand, when the movable plate 51 is in the engaging position, the stopper counterpart 51a meshes with the stopper 31b, and therefore, the movement of the movable plate 51, the link guide 52, and the base 42 with respect to the grip 30 is restricted. The movement of the movable plate 51 between the engaging position and the non-engaging position is performed by an operation of the lock mechanism L. The lock mechanism L is hereinafter described in detail.

As depicted in FIG. 6B, the support shaft 54 is arranged such that the axial line thereof is directed in the leftward and rightward direction. The support shaft 54 is fixed at an end portion thereof to the movable plate 51 by a screw and moves in the upward and downward direction together with the movable plate 51. The support shaft 54 is fitted in holes defined at base portions of the links 53U and 53L such that the links 53U and 53L are rotatable around the support shaft 54. The links 53U and 53L extend upward and downward from the support shaft 54, respectively. The links 53U and 53L have connection portions 53a and 53b, respectively, at positions thereof spaced from the support shaft 54. The base 42 is connected to the connection portions 53a and 53b. In particular, the connection portions 53a and 53b are fitted in holes 42a and 42b defined in the base 42, respectively, and separation of the connection portions 53a and 53b and the base 42 from each other in the axial direction of the support shaft 54 is restricted by washers 59 and screws 58. The links 53U and 53L each have a guided portion 53c at an end portion thereof. Guide slits 52b of an arcuate shape centered at the support shaft 54 are formed in the link guide 52, and the guided portions 53c of the links 53U and 53L are caught by the guide slits 52a. The guided portions 53c are movable around the support shaft 54 in a state in which they are caught by the guide slits 52a.

The base 42 has an elongated hole 42e (refer to FIG. 3) defined therein such that the support shaft 54 is fitted in the elongated hole 42e. The elongated hole 42e is a hole elongated in the forward and rearward direction. The elongated hole 42e permits change of the relative positions of the support shaft 54 and the base 42 in the forward and rearward direction and restricts change of the relative positions of them in the upward and downward direction. Accordingly, the support shaft 54, the base 42, and the movable plate 51 move upward and downward together with each other. The base 42 has the holes 42a and 42b (refer to FIG. 3) defined therein such that the connection portions 53a and 53b of the links 53U and 53L are fitted in the holes 42a and 42b, respectively. The elongated hole 42b is a hole elongated in the upward and downward direction. The holes 42a and 42b permit change of the relative positions of the connection portions 53a and 53b and the base 42 in the upward and downward direction and restrict change of the relative positions of them in the forward and rearward direction.

In this manner, the base 42 is connected to the connection portions 53a and 53b of the links 53U and 53L that are rotatable around the support shaft 54. The connection portions 53a and 53b are located on sides opposite to each other across the support shaft 54. By this structure, the rotation of the base 42 around the support shaft 54 and the parallel movement of the base 42 are permitted.

Figure 9A:
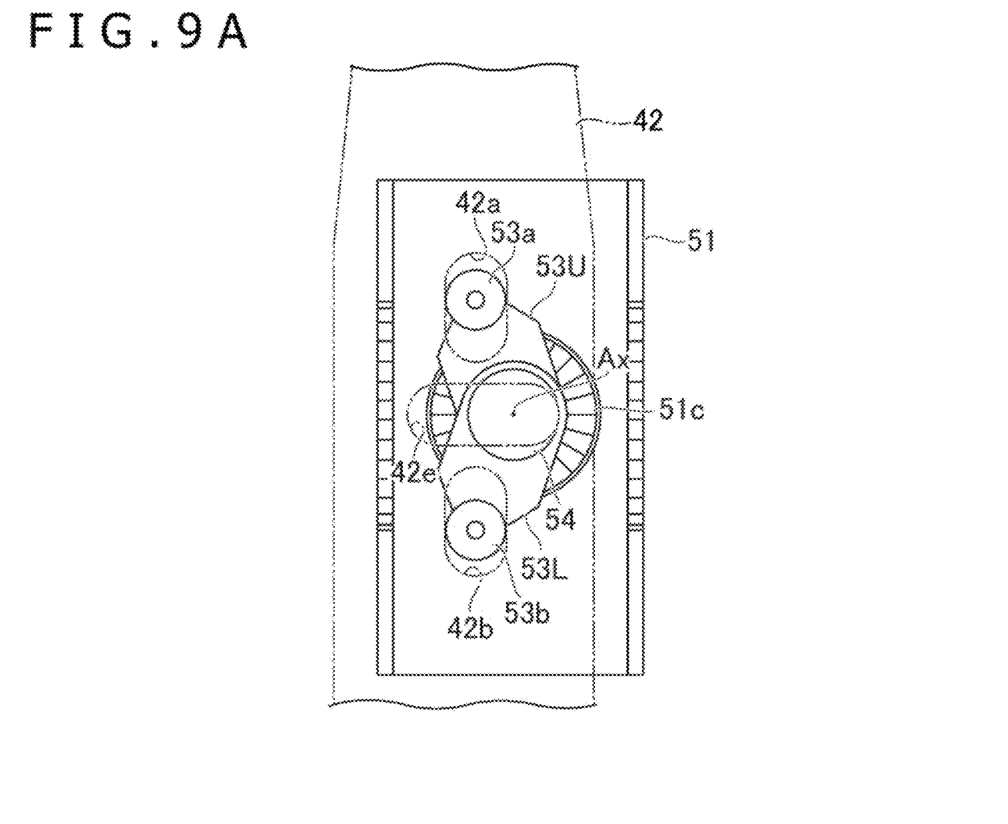
FIG. 9A is a view depicting a movement of the position adjustment mechanism in a case where the base moves in a forward and rearward direction.
Figure 9B:
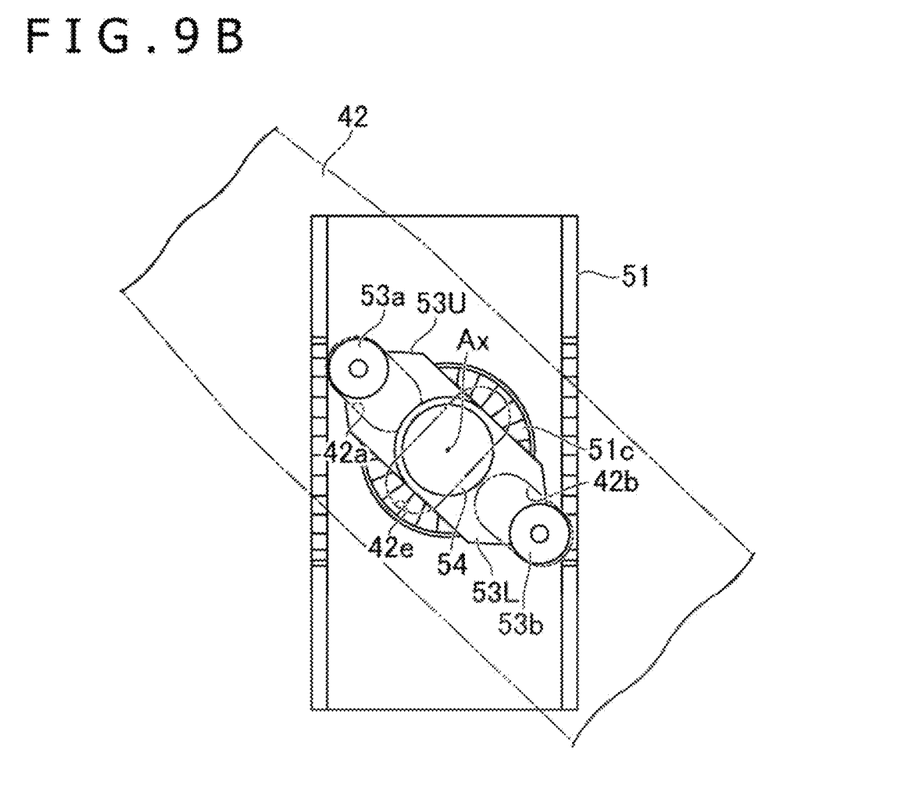
FIG. 9B is a view depicting a movement of the position adjustment mechanism in a case where the base is tilted.

In the example of the input device 100, the two connection portions 53a and 53b are located on the sides opposite to each other in the upward and downward direction across the support shaft 54. Therefore, when both of the links 53U and 53L rotate forward as depicted in FIG. 9A, the parallel movement of the base 42 in the forward direction is permitted. In contrast, when both of the links 53U and 53L rotate rearward, the parallel movement of the base 42 in the rearward direction is permitted. Further, when the link 53U rotates forward (or rearward) and the link 53L rotates rearward (or forward) as depicted in FIG. 9B, the base 42 can rotate around an axial line (the axial line Ax of the support shaft 54) that is directed in the leftward and rightward direction. The movable range of the base 42 by the rotation of the links 53U and 53L can be defined, for example, by the length of the guide slits 52*a* formed in the link guide 52.

As described hereinabove, the support shaft 54 is attached to the movable plate 51, and the links 53U and 53L are connected to the support shaft 54. Therefore, the support shaft 54 and the links 53U and 53L move upward and downward together with the movable plate 51 and the link guide 52. Accordingly, the base 42 can be moved in the upward and downward direction and besides can be tilted forward or rearward as depicted in (c) of FIG. 5, or can be moved in the upward and downward direction and besides can be parallelly moved forward or rearward.

It is to be noted that the center of rotation of the base 42 does not necessarily coincide with the axial line Ax of the support shaft 54. For example, in a case where the base 42 first moves forward as depicted in FIG. 9A and then rotates as indicated in FIG. 9B, the center of rotation of the base 42 is the center of the connection portion 53*a* of the link 53U. The arrangement of the links 53U and 53L is not limited to the example of the input device 100. For example, in an initial state of the base 42 (in a state in which the base 42 is positioned midway in the movable range), the link 53U may extend obliquely forward from the support shaft 54, and the link 53L may extend obliquely rearward from the support shaft 54.

Figure 4:
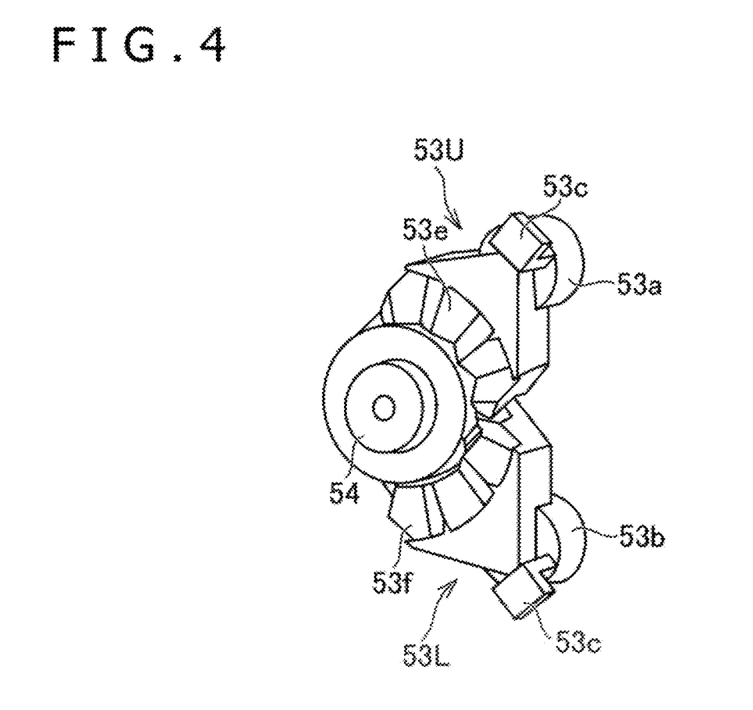
FIG. 4 is a perspective view of links configuring the position adjustment mechanism. Faces of the links facing a movable plate are depicted.

A stopper 51*c* (refer to FIG. 3) in the form of gear teeth is formed on the movable plate 51. The stopper 51*c* has an annular shape centered at the support shaft 54. Further, stopper counterparts 53*e* and 53*f* (refer to FIG. 4) in the form of gear teeth are formed on the links 53U and 53L, respectively. The stopper counterparts 53*e* and 53*f* face the stopper 51*c* (refer to FIG. 6B). As described hereinabove, the movable plate 51 is movable between the non-engaging position (refer to FIG. 6B) and the engaging position (refer to FIG. 7). When the movable plate 51 is in the non-engaging position, the stopper 51*c* is spaced from the stopper counterparts 53*e* and 53*f*, and therefore, the rotation and the movement in the forward and rearward direction of the base 42 are permitted. On the other hand, when the movable plate 51 is in the engaging position, the stopper 51*c* meshes with the stopper counterparts 53*e* and 53*f*, and therefore, the rotation and the movement in the forward and rearward direction of the base 42 are restricted. In this manner, the lock mechanism L restricts the movement of the base 42 by locking the movement of the links 53U and 53L.

Lock Mechanism

The position adjustment mechanism Pm has the lock mechanism L including the lock operation lever 61, the intermediate lever 62, and the lock slider 63 (refer to FIG. 3). The lock mechanism L moves the movable plate 51 between the engaging position and the non-engaging position. In the example of the input device 100, the lock mechanism L moves the movable plate 51 from the non-engaging position (FIGS. 6A and 6B) to the engaging position (refer to FIG. 7) by pulling the support shaft 54 to an outer side of the grip wall 31. In contrast, the lock mechanism L moves the movable plate 51 from the engaging position to the non-engaging position by pushing the support shaft 54 to the inner side of the grip wall 31.

Figure 10:
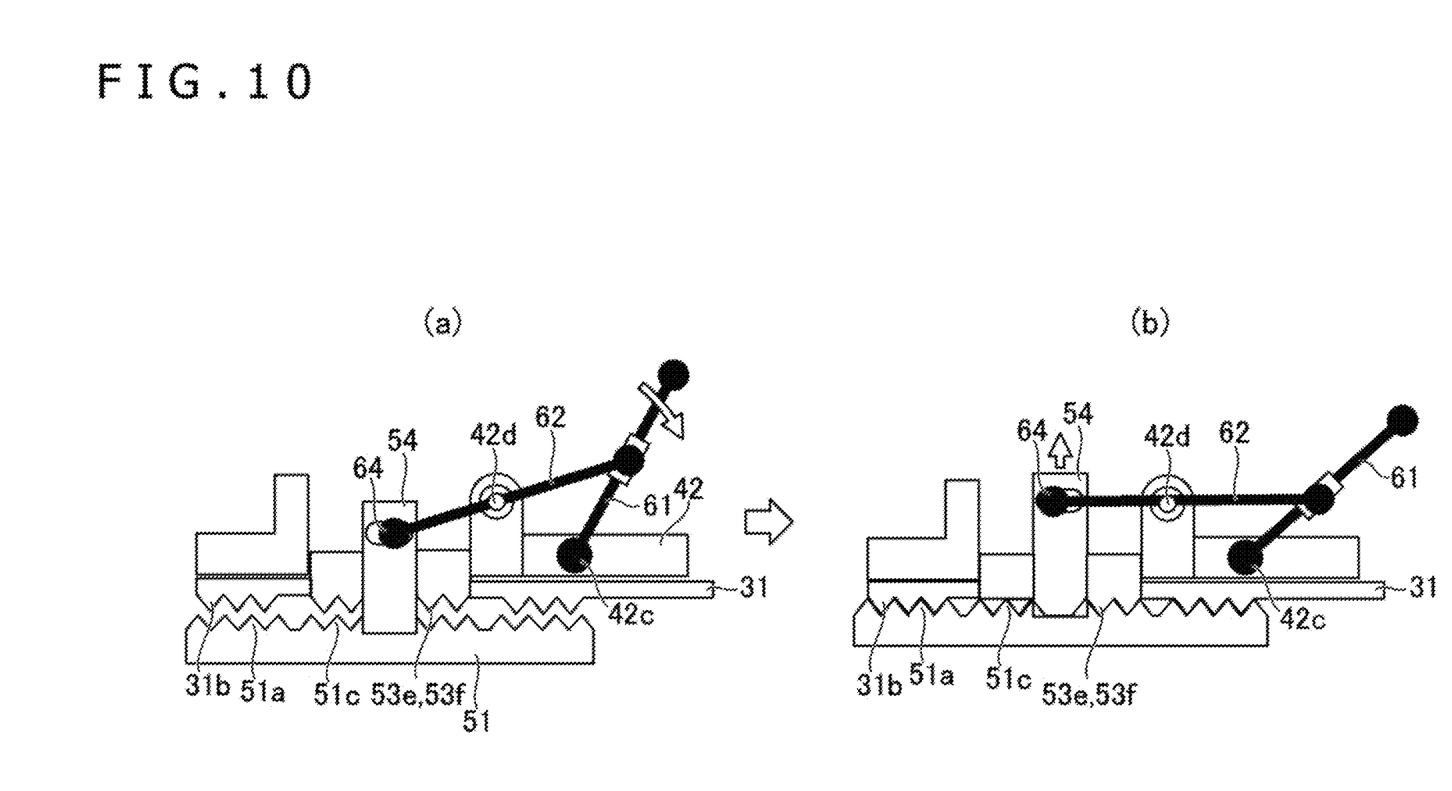
FIG. 10 illustrates cross sectional views for explaining a movement of a lock mechanism.

FIGS. 10A and 10B are schematic views depicting the lock mechanism L. In FIG. 10A, the movable plate 51 is in the non-engaging position, and in FIG. 10B, the movable plate 51 is placed in the engaging position.

One end of the lock operation lever 61 is rotatable around a fulcrum 42*c* supported rotatably by the base 42. One end of the intermediate lever 62 is connected to the lock operation lever 61 at a position spaced from the fulcrum 42*c*. Another end of the intermediate lever 62 is connected to the support shaft 54 through a connection shaft 64. The base 42 has a fulcrum 42*d* that is located between the opposite ends of the intermediate lever 62 and supports the intermediate lever 62 thereon.

The lock operation lever 61 can move between an unlock position ((a) of FIG. 10 and FIGS. 6A and 6B) and a lock position ((b) of FIG. 10 and FIG. 7). When the lock operation lever 61 is in the unlock position, the lock operation lever 61 stands and is spaced leftward from the grip wall 31. At this time, the movable plate 51 is in the non-engaging position and is spaced from the inner face of the grip wall 31. Accordingly, the stopper counterpart 51*a* (FIG. 8B) of the movable plate 51 does not mesh with the stopper 31*b* of the grip wall 31, and the stopper 51*c* (FIG. 6B) of the movable plate 51 does not mesh with the stopper counterparts 53*e* and 53*f* of the links 53U and 53L ((a) of FIG. 10). When the lock operation lever 61 is in the lock position, the lock operation lever 61 is positioned closer to the grip wall 31 and is arranged along the grip wall 31. At this time, the support shaft 54 is pulled out to the outer side of the grip wall 31 through the intermediate lever 62 by the lock operation lever 61, and the movable plate 51 is placed in the engaging position. As a result, the stopper counterpart 51*c* of the movable plate 51 meshes with the stopper 31*b* of the grip wall 31, and the stopper 51*c* of the movable plate 51 meshes with the stopper counterparts 53*e* and 53*f* of the links 53U and 53L ((b) of FIG. 10).

In this manner, when the lock operation lever 61 moves from the unlock position to the lock position, all of the movement of the base 42 in the upward and downward direction (that is, the movement of the strap 40), the movement of the base 42 in the forward and rearward direction, and the rotation of the base 42 are restricted. Therefore, the working property of the position adjustment work of the strap 40 can be enhanced. Especially, the lock operation lever 61 is arranged along a side face of the grip 30 and is located between the strap 40 and the grip 30. Therefore, when the user puts his/her hand between the grip 30 and the strap 40 and grasps the grip 30, the lock operation lever 61 is moved from the unlock position to the lock position without the necessity for any other operation of the user.

The lock slider 63 is slidably movable along the side face of the grip 30. As depicted in FIG. 7, when the lock operation lever 61 is in the lock position, the lock slider 63 is caught by the lock operation lever 61 and holds its position at the lock position. The lock slider 63 has an engaging portion (pawl) 63*a* for engaging with the lock operation lever 61. When the lock slider 63 slidably moves upward, the engagement between the lock operation lever 61 and the lock slider 63 is cancelled, and the lock operation lever 61 returns to the unlock position as depicted in FIG. 6A. Between the lock operation lever 61 and the base 42, an elastic member (for example, a spring 57) is arranged which biases the lock operation lever 61 to the unlock position.

Modifications

It is to be noted that the input device proposed in the present disclosure is not limited to the structure of the input device 100 described above.

For example, the input device 100 may not have the base 42. In this case, the upper end and the lower end of the strap 40 may be connected to the grip 30. Further, the upper end and the lower end of the strap 40 may be connected to the grip 30 such that they are movable in the upward and downward direction and the forward and rearward direction.

As another example, the base 42 may be movable in only either the upward and downward direction or the forward and rearward direction. In this case, the position adjustment mechanism Pm may not have the links 53U and 53L. The base 42 may be supported rotatably by the support shaft 54.

The invention claimed is:

1. An input device comprising:
   an operation unit having disposed thereon an operation member that is operated by a user's finger;
   a grip located below the operation unit and extending in an upward and downward direction;
   a base attached to the grip;
   a position adjustment mechanism; and
   a strap located leftward or rightward with respect to the grip, wherein,
   the strap has an upper end and a lower end,
   the upper end and the lower end of the strap are attached to the base,
   the position adjustment mechanism permits change of a relative position of the base with respect to the grip, and
   when the grip is viewed in a leftward and rightward direction, a position of the strap is movable in at least either the upward and downward direction or a forward and rearward direction, and the strap is rotatable.

2. The input device according to claim 1, wherein the position of the strap is movable in both the upward and downward direction and the forward and rearward direction.

3. The input device according to claim 1, wherein the strap has an upper end and a lower end, and rotation of the strap moves a position of the upper end and a position of the lower end individually with respect to the grip.

4. The input device according to claim 1, further comprising:
   a lock operation member that is movable between a lock position and an unlock position by the user, wherein the position of the strap is movable in both the upward and downward direction and the forward and rearward direction, and,
   when the lock operation member is in the lock position, a movement of the strap in the upward and downward direction, a movement of the strap in the forward and rearward direction, and rotation of the strap are restricted.

5. The input device according to claim 1, wherein the base is movable in at least either the upward and downward direction or the forward and rearward direction and is rotatable.

6. The input device according to claim 1, wherein the position adjustment mechanism has a movable member capable of moving along the grip by being guided by the grip, and
   the base is connected to the movable member.

7. The input device according to claim 1, wherein
   the position adjustment mechanism has a support shaft, and
   the base is rotatable around the support shaft.

8. The input device according to claim 7, wherein
   the position adjustment mechanism has a first link rotatable around the support shaft and a second link rotatable around the support shaft,
   the first link and the second link have a first base connection portion and a second base connection portion, respectively, located on sides opposite to each other across the support shaft, and
   the base is connected to the first base connection portion and the second base connection portion.

9. The input device according to claim 8, wherein
   the position adjustment mechanism has a movable member capable of moving along the grip by being guided by the grip, and
   the support shaft is attached to the movable member.

* * * * *